(12) United States Patent
Chu et al.

(10) Patent No.: US 7,746,926 B2
(45) Date of Patent: Jun. 29, 2010

(54) PULSE WIDTH MODULATION REGULATOR SYSTEM WITH AUTOMATICALLY SWITCHING PULSE SKIPPING MODE

(75) Inventors: Kwan-Jen Chu, Hsin-Chu (TW); Chung-Lung Pai, Hsin-Chu (TW); Po-Shun Chung, Taichung (TW); Jing-Meng Liu, Hsin-Chu (TW)

(73) Assignee: Richtek Technology Corp., Hsinchu (TW)

( * ) Notice: Subject to any disclaimer, the term of this patent is extended or adjusted under 35 U.S.C. 154(b) by 1261 days.

(21) Appl. No.: 11/272,699

(22) Filed: Nov. 15, 2005

(65) Prior Publication Data
US 2006/0268974 A1    Nov. 30, 2006

(30) Foreign Application Priority Data
May 31, 2005    (TW)    .............................. 94117831 A

(51) Int. Cl.
*H03K 7/08*    (2006.01)
*H03K 9/08*    (2006.01)

(52) U.S. Cl. ....................... 375/238; 332/109; 332/110; 332/111; 370/212

(58) Field of Classification Search ................. 375/238; 332/109–111; 370/212
See application file for complete search history.

(56) References Cited

U.S. PATENT DOCUMENTS 6,396,252 B1 *    5/2002    Culpepper et al. .......... 323/285
6,724,174 B1 *    4/2004    Esteves et al. .............. 323/224

\* cited by examiner

*Primary Examiner*—Curtis B Odom
(74) *Attorney, Agent, or Firm*—Stout, Uxa, Buyan & Mullins, LLP

(57) ABSTRACT

A pulse width modulation (PWM) Regulator System with automatically switching pulse skipping mode (PSM) is disclosed. The PWM regulator system comprises a PWM regulator, a PSM switching module and a pulse generator. The PWM regulator converts the input voltage by PWM. The PSM switching module determines to enter or exit the PSM. The pulse generator adaptively produces pulse signal for the switching regulator to operate in PSM.

4 Claims, 8 Drawing Sheets

PULSE WIDTH MODULATION REGULATOR SYSTEM WITH AUTOMATICALLY SWITCHING PULSE SKIPPING MODE

BACKGROUND OF THE INVENTION

1. Field of the Invention

The present invention relates to a regulator system with automatically switching pulse skipping mode, and more particularly relates to a pulse width modulation regulator system with automatically switching pulse skipping mode.

2. Description of the Prior Art

In the switching mode regulator, the pulse width modulation (PWM) is extensively used in the method of voltage transformation. When the circuit is needed to provide voltage during the heavy load, the inductor current of the circuit is maintained in the Continuous Conduction Mode (CCM). And the switching speed of PWM is high enough to provide higher power density for heavy load. However, when the circuit is only needed to provide voltage during light load, the inductor current of the circuit is maintained in the Discontinuous Conduction Mode (DCM). And the switching speed of PWM is low enough to provide lower power density for light load.

In the prior art, the PWM regulator is only needed to provide low voltage for light load. In order to reduce the power switching loss, the solution of the prior art is to use pulse skipping mode (PSM) to reduce the number of times to turn on or off the switch in the circuit and achieve the power saving. The PWM regulator with PSM in the prior art, when the circuit is operated in the Continuous Conduction Mode, the output voltage will come with bigger pulse because of the PSM and the phase is not stable.

The traditional asynchronous step-down converter with PSM is shown in FIG. 1. The circuit comprises an error amplifier 100, a comparator 103, a ramp generator 106, a pulse generator with minimum-on-time 109, an OR gate 112, an activator 115, a switch SW1, a diode D1, an inductor L1 and a capacitance C1. In the traditional circuit of FIG. 1, the circuit is added a pulse generator 109 with minimum-on-time to have the pulse skipping mode and save the power. And the inductor current of the circuit can be in the Continuous Conduction Mode (CCM) or the Discontinuous Conduction Mode (DCM). Because the Continuous Conduction Mode (CCM) is not exited in the traditional circuit and the circuit will be adaptively turned off the pulse skipping mode, the switching ratio of the input voltage and the output voltage is very high in the circuit. And the output voltage will be big because of the PSM and the phase will be not stable.

FIG. 2 is a traditional Asynchronous step-up converter with pulse skipping mode (PSM). The circuit comprises an error amplifier 200, a comparator 203, a ramp generator 206, a pulse generator 209 with minimum-on-time, an OR gate 212, an activator 215, a switch SW2, a diode D2, an inductor L2, and a capacitance C2. In the traditional circuit of FIG. 2, the circuit is also added a pulse generator 209 with minimum-on-time in order to have the PSM and save the power. And the inductor current of the circuit can be Continuous Conduction Mode (CCM) or Discontinuous Conduction Mode (DCM). Because the Continuous Conduction Mode (CCM) is not exited in the traditional circuit and the circuit will be adaptively turned off the pulse skipping mode, the switching ratio of the input voltage and the output voltage is very high in the circuit. And the pulse of the output voltage will be big because of the PSM and the phase will be not stable.

Because of the reason described above, the circuit can be operated in Discontinuous Conduction Mode (DCM) to save the power because of the pulse skipping mode (PSM). However, when the circuit is operated in the Continuous Conduction Mode (CCM), the pulse of the output voltage is too big and the phase is not stable. It is necessary to provide a method or system with an operative mode to enable or disable the pulse skipping mode.

SUMMARY OF THE INVENTION

According to the prior art described above, there are many drawbacks in the traditional pulse width modulation (PWM) regulator system with pulse skipping mode (PSM). The purpose of the present invention is to provide a pulse width modulation (PWM) regulator system with automatically switching the pulse skipping mode (PSM). The circuit can be adaptively enable or disable the pulse skipping mode (PSM) according to the operative mode of the circuit.

The other purpose of the present invention is to provide a pulse width modulation regulator system with automatically switching the pulse skipping mode to reduce the pulse of the output voltage, to steady the phase of the output voltage and to remove the inductor current accumulated when the circuit is operated in the Continuous Conduction Mode.

According to the purposes described above, a pulse width modulation regulator system with automatically switching PSM is provided herein. The circuit comprises a pulse width modulation regulator (such as synchronous step-down converter, asynchronous step-down converter, synchronous step-up converter, or asynchronous step-up converter), which is used to convert the input voltage to output voltage by the pulse width modulation. A pulse skipping mode switch module is used to detect the inductor current of the converter and decide to turn on or turn off the pulse skipping mode. When the pulse skipping mode switch module decides to turn on the pulse skipping mode, the pulse generator generates a pulse signal to let the converter work in the pulse skipping mode. However, when the pulse skipping mode switch module decides to turn off the pulse skipping mode, the pulse generator stops to generate the pulse signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

A pulse width modulation (PWM) regulator system with automatically switching pulse skipping mode (PSM) is disclosed in the present invention. The pulse width modulation (PWM) regulator system comprises a synchronous step-up converter, an asynchronous step-up converter, a synchronous step-down converter, and an asynchronous step-down converter. In addition, The pulse width modulation (PWM) regulator system can enable or disable the pulse skipping mode (PSM) as the operative mode is Continuous Conduction Mode (CCM) or Discontinuous Conduction Mode (DCM).

Figure 1:
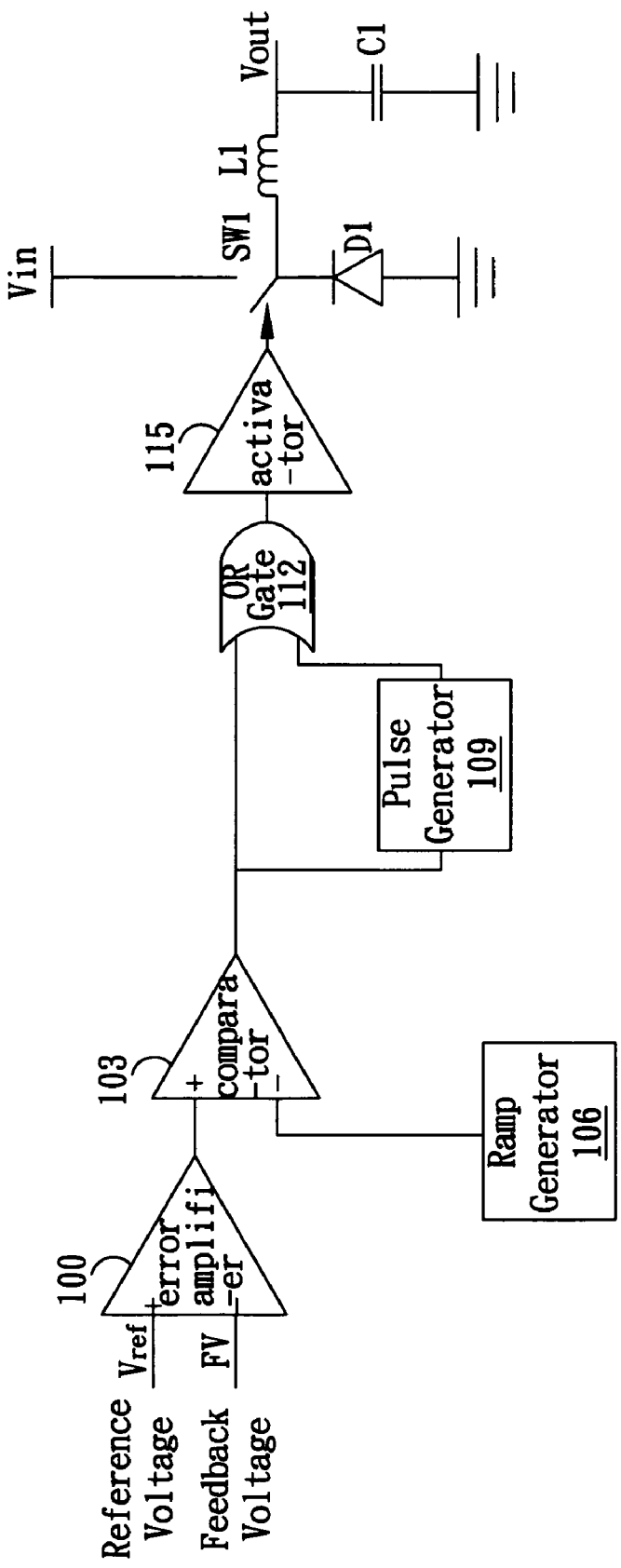
FIG. 1 is a traditional pulse width modulation (PWM) asynchronous step-up converter with pulse skipping mode (PSM).
Figure 2:
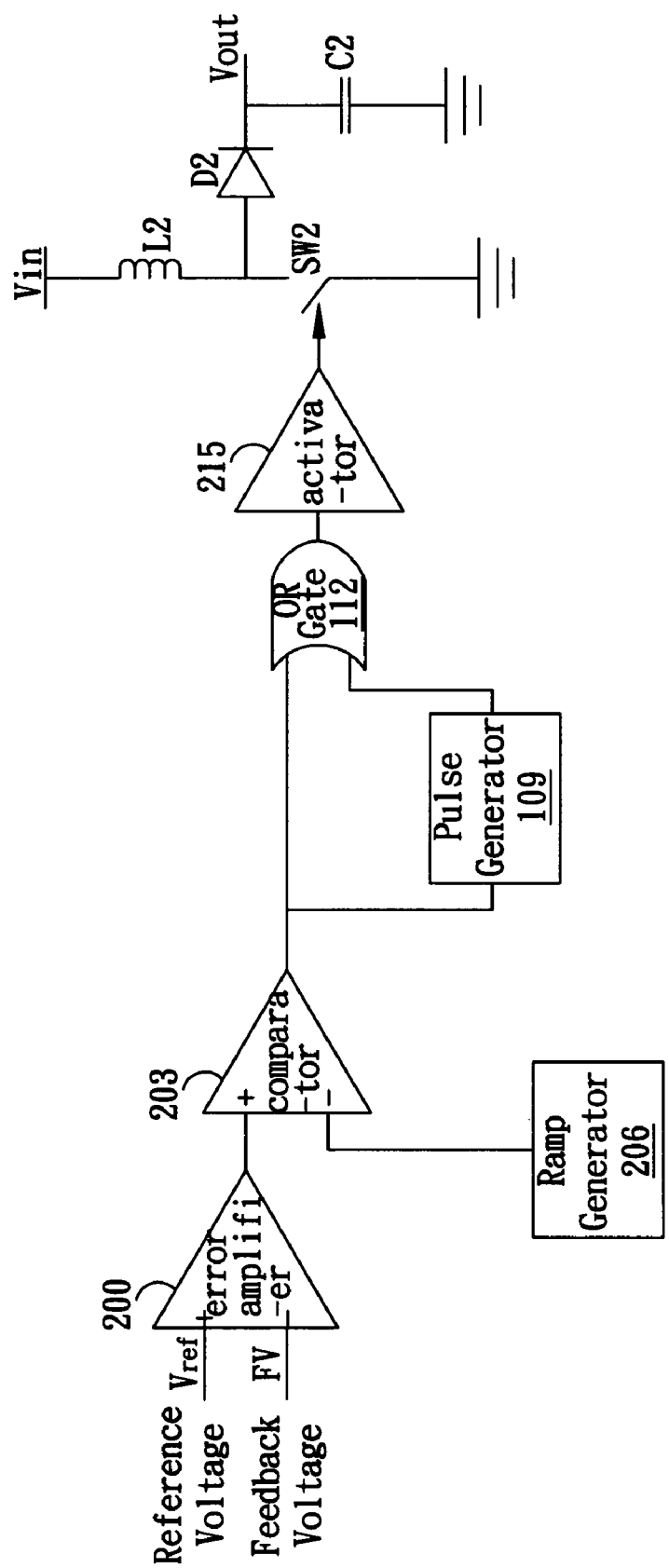
FIG. 2 is a traditional pulse width modulation (PWM) asynchronous step-down converter with pulse skipping mode (PSM).
Figure 3:
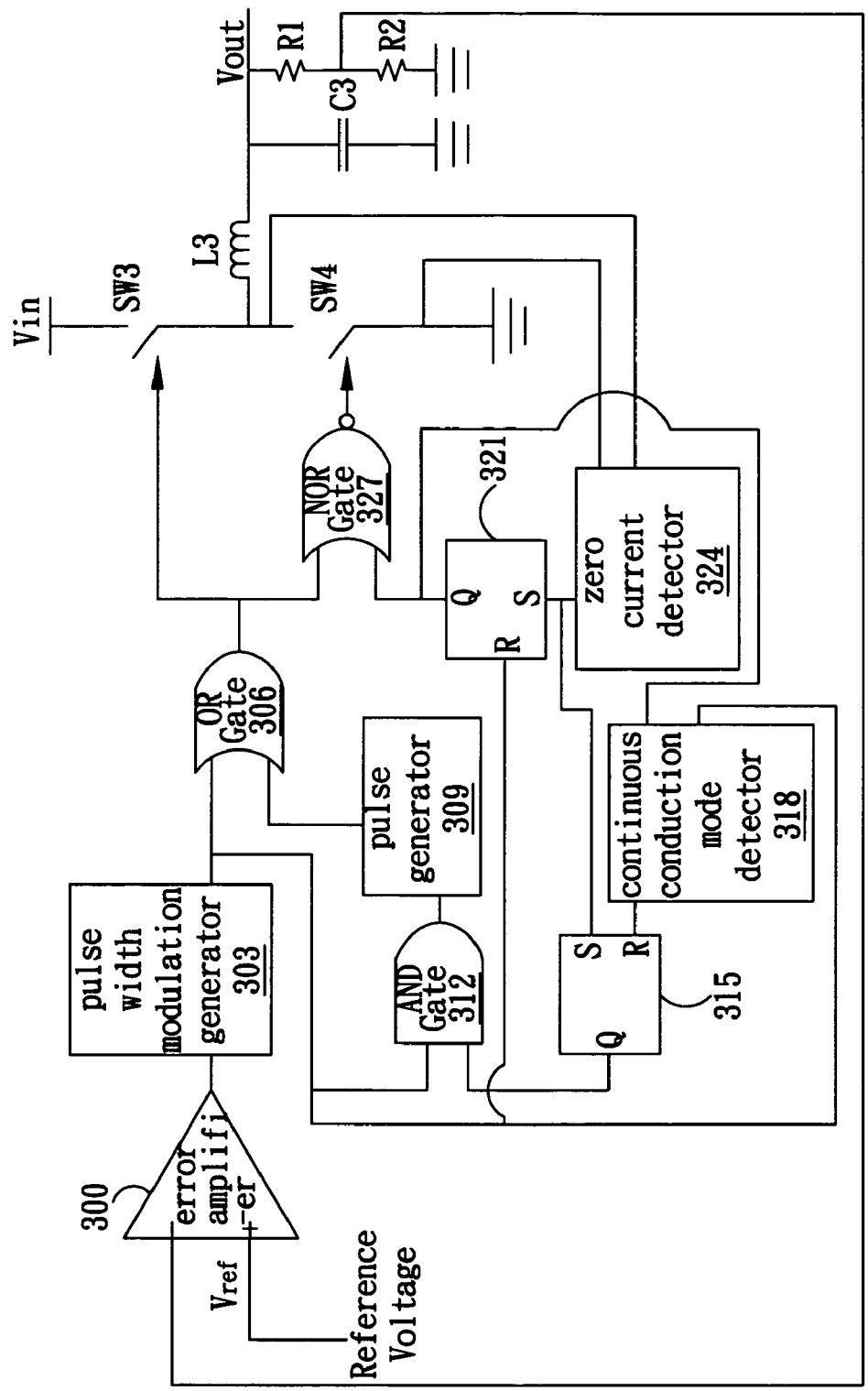
FIG. 3 is a traditional pulse width modulation (PWM) synchronous step-down converter with pulse skipping mode (PSM) in a preferred embodiment of the present invention.

FIG. 3 is an embodiment of the present invention. A synchronous step-down converter with automatically switching pulse skipping mode (PSM) comprises an error amplifier 300, a pulse width modulation generator 303, an OR gate 306, a pulse generator 309, an AND gate 312, a SR latch 315, a continuous conduction mode detector 318, SR latch 321, a zero current detector 324, a NOR gate 327, a switch SW3, a switch SW4, an inductor L3, a capacitance C3, a resistance R1, and a resistance R2.

The negative input of the error amplifier 300 in the FIG. 3 is received a feedback signal from the output divided voltage signal. And the positive input is received a reference voltage (Vref). After comparing these two signals, the error amplifier outputs an error signal to the PWM generator 303. The outputs of the PWM generator 303 are connected to the input of the OR gate 306, the input of the AND gate 312, one of the inputs of the Continuous Conduction Mode (CCM) detector 318, and the R end of the SR latch 321. The other output of the OR gate is connected to the output of the pulse generator 309. And the output of the OR gate 306 is connected to the one of the inputs of the NOR gate 327 and the switch SW3.

The other input of the NOR gate 327 is connected to the Q end of the SR latch 321 and one input of the Continuous Conduction Mode (CCM) detector 318. The output of the NOR gate 327 is connected to the switch SW4. The two ends of the switch SW4 are respectively connected to two inputs of the zero detector 324. The output of the zero detector 324 is connected to the S end of the SR latch 321 and the SR latch 315. The R end of the SR latch 315 is connected to the output of the Continuous Conduction Mode detector 318. And the Q end of the SR latch 315 is connected to the other input of the AND gate 312.

Still referring to FIG. 3, one end of the switch SW3 is connected to the input voltage Vin and the other end of which is connected to the switch SW4. The other end of the switch SW4 is connected to the ground. An inductor L3 is connected between two switches SW3 and SW4. And the other end of the inductor L3 is connected to a capacitance C3 and a resistance R1. The voltage of the resistance R1 is the output voltage Vout. In addition, the other end of the capacitance C3 is connected to the ground and the other end of the resistance R1 is connected to the resistance R2. And the other end of the resistance R2 is connected to the ground.

In the embodiment of FIG. 3, the switches SW3 and SW4 are in the continuous mode. When one of the switches is conductive, the other one is not. The input voltage Vin provides the voltage for the output, when two switches SW3 and SW4 save the power at the inductor L3 and the capacitance C3. The output voltage will be divided by the resistance R1 and the resistance R2 to provide a feedback voltage for the error amplifier 300. The error amplifier 300 output the error signal, which is compared by the feedback voltage and the reference voltage, to the PWM generator 303. At the moment, the zero current detector 324 detects whether the inductor current of the circuit is zero and outputs a control signal to the SR latch 321 and the SR latch 315.

According to the control signal of the zero current detector and the signal of the PWM generator 303, the SR latch 321 is able to control the NOR gate 327. The Continuous Conduction Mode (CCM) detector 318 detects the circuit is in the CCM or Discontinuous Conduction Mode (DCM) by the output signal of the SR latch 321 and the signal of the PWM generator 303. The SR latch 315 outputs a signal to control the AND gate 312 by the control signal of the zero current detector 324 and the output signal of the CCM detector 318. The AND gate decides to enable or disable the pulse generator 309 by the signal of the PWM generator 303 and the signal of the SR latch 315. If the pulse generator 309 were enabled, the circuit was in the discontinuous conduction mode. On the other hand, if the pulse generator 309 were disabled, the circuit was in the continuous conduction mode. And because the PSM is disabled, the pulse of the output voltage is smaller and the phase is stable.

Figure 4:
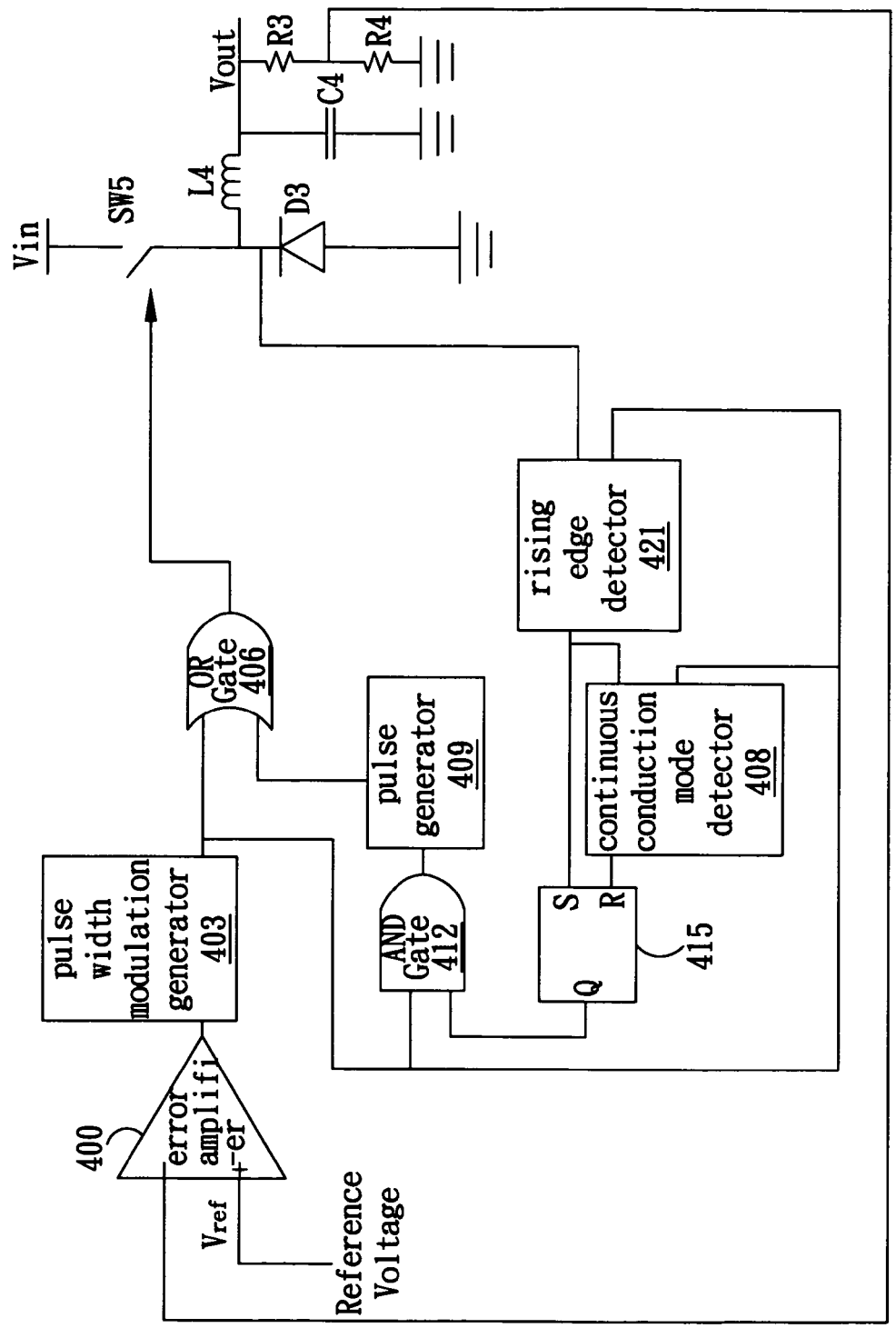
FIG. 4 is a pulse width modulation (PWM) asynchronous step-down converter with pulse skipping mode (PSM) in a preferred embodiment of the present invention.

Now referring to FIG. 4, this embodiment of the present invention illustrates an asynchronous step-down converter with automatically switching PSM. The converter comprises an error amplifier 400, a PWM generator 403, an OR gate 406, a pulse generator 409, an AND gate 412, a SR latch 415, a CCM detector 418, a rising edge detector 421, a switch SW5, a diode D3, an inductor L4, a capacitor C4, a resistance R3, and a resistance R4.

The negative input of the error amplifier 400 in FIG. 4 is received a feedback voltage from the output divided voltage signal. The positive input of the error amplifier 400 is received a reference voltage Vref. According to signals of the feedback voltage and the reference voltage, the error amplifier 400 outputs an error signal to the PWM generator 403. The output of the PWM generator 403 is connected to the input of the OR gate 406, the input of the AND gate 412, the input of the CCM detector 418 and one input of the rising edge detector 421. The other input of the OR gate 406 is connected to the output of the pulse generator 409. And the output of the OR gate 406 is connected to the switch SW5.

One end of the switch SW5 is connected to the input voltage Vin and the other end is connected to the diode D3. And the other end of the diode D3 is connected to the ground. An inductor L4 is connected between the switch SW5 and the diode D3. And the one end of the rising edge detector 421 is connected between the diode D3 and the inductor L4. The other end of the inductor L4 is connected to the capacitance C4 and the resistance R3. In addition, the voltage between the capacitance C4 and the resistance R3 is the output voltage Vout. The other end of the capacitance C4 is connected to the ground. One end of the resistance R3 is connected to the resistance R4 and the other end is connected to the ground. The output of the rising edge detector 421 is connected to the S end of the SR latch 415 and the other input of the CCM detector 418. The output of the CCM detector 418 is connected to the R end of the SR latch 415 and the Q end of the SR latch 415 is connected to the other input of the AND gate 412. The output of the AND gate 412 is connected to the input of the pulse generator 409.

FIG. 4 is another embodiment of the present invention. The input voltage Vin provides the output voltage, when the switch SW5 is operated to save and release the power in the inductor L4 and the capacitance C4. The output voltage is divided by the resistance R3 and the resistance R4 to provide a feedback voltage for the error amplifier 400. The error amplifier 400 outputs an error signal, which is obtained by comparing the feedback voltage and the reference voltage, for the PWM generator 403. At the moment, the rising edge detector 421 detects whether the rising edge pulse is existed between the ends of the switch SW5 and the diode D3. The rising edge detector 421 outputs a control signal to the CCM detector 418 and the S end of the SR latch 415 according to the rising edge pulse and the signal of the PWM generator 403.

According to the output signal of the CCM detector 418 and the signal of the PWM generator 403, the CCM detector 418 detects whether the circuit is in the CCM or the DCM. The SR latch 415 outputs a signal to control the AND gate 412 according to the control signal of the rising edge detector 421 and the output signal of the CCM detector 418. The AND gate 412 decides to enable or disable the pulse generator 409 by the output signal of the PWM generator 403 and the Q end of the SR latch 415. If the pulse generator were enabled, the circuit was in the DCM and saved the power. If the pulse generator were disabled, the circuit was in the CCM and the pulse of the output voltage is small and the phase is stable.

Figure 5:
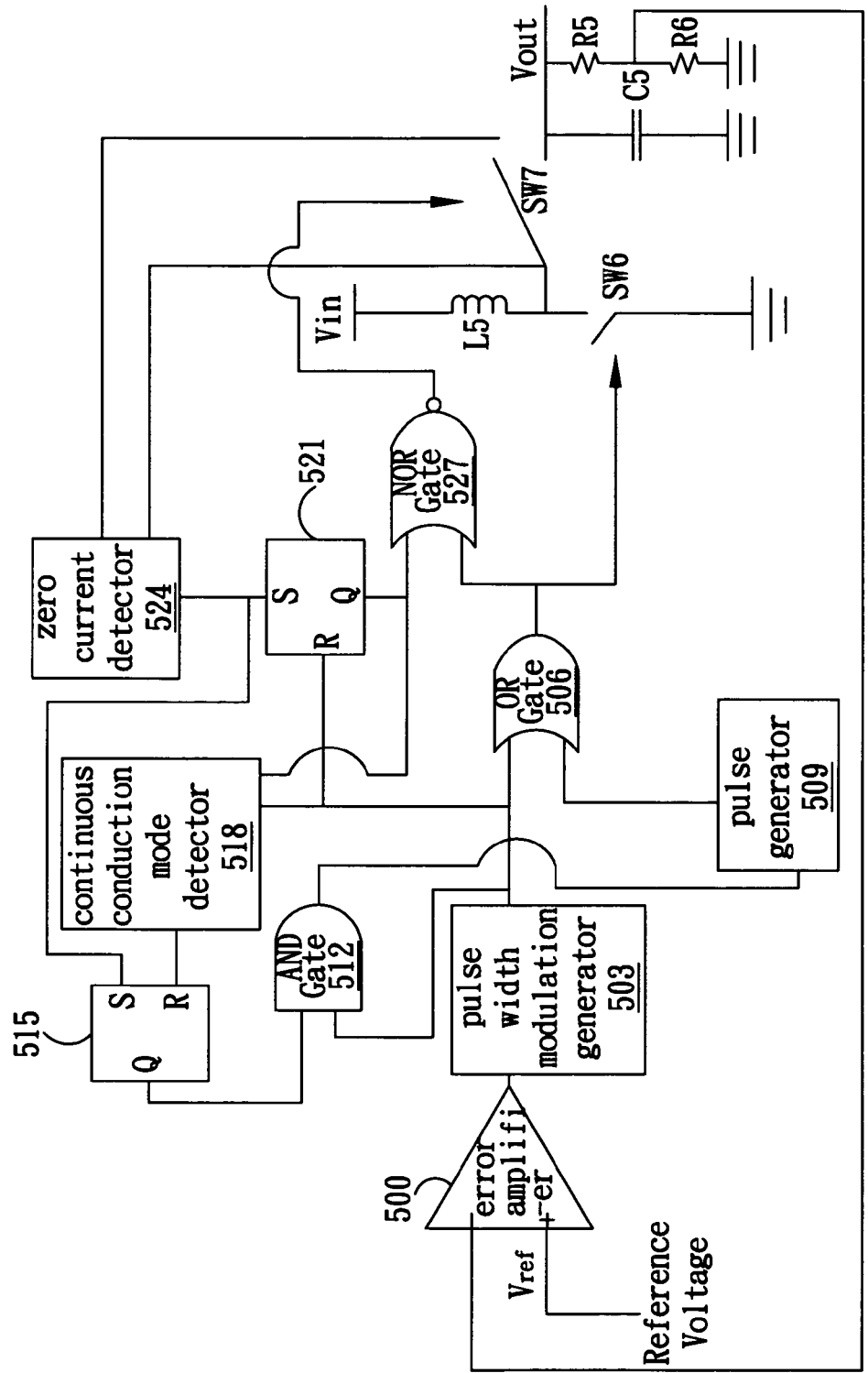
FIG. 5 is a pulse width modulation (PWM) synchronous step-up converter with pulse skipping mode (PSM) in a preferred embodiment of the present invention.

The synchronous step-up converter with automatically switching PSM is shown in one embodiment of the present invention of FIG. 5. The converter comprises an error amplifier 500, a PWM generator 503, an OR gate 503, a pulse generator 509, an AND gate 512, a SR latch 515, a CCM detector 518, a SR latch 521, a zero current detector 524, a NOR gate 527, a switch SW6, a switch SW7, an inductor L5, a capacitor C5, a resistance R5, and a resistance R6.

The negative input of the error amplifier 500 is received a feedback signal from the divided input voltage in FIG. 5. The positive input of the error amplifier 500 is received a reference voltage Vref. And after comparing the feedback signal and the reference voltage Vref, the error amplifier 500 outputs an error signal to the PWM generator 503. The output of the PWM generator 503 is connected to the input of the OR gate 506, the input of the AND gate 512, the input of the CCM detector 518, and the R end of the SR latch 521. The other input of the OR gate 506 is connected to the output of the pulse generator 509. The output of the OR gate 506 is connected to the input of the NOR gate 527 and the switch SW6.

The other input of the NOR gate 527 is connected to the Q end of the SR latch 521 and the other input of the CCM detector 518. The output of the NOR gate 527 is connected to the switch SW7. The two ends of the switch SW7 are respectively connected to the two inputs of the zero current detector 524. The output of the zero current detector 524 is connected to the S end of the SR latch 521 and the S end of the SR latch 515. The R end of the SR latch 515 is connected to the output of the CCM detector 518. The Q end of the SR latch 515 is connected to the other input of the AND gate 512.

The one end of the inductor L5 is connected to the input voltage Vin, and the other end is connected to the switch SW6. The other end of the switch SW6 is connected to the ground. The switch SW7 is connected between the inductor L5 and the switch SW6. The other end of the switch SW7 is connected to the capacitor C5 and the resistance R5. The voltage between the capacitor C5 and the resistance R5 is the output voltage Vout. The other end of the capacitor C5 is connected to the ground. The other end of the resistance R5 is connected to the resistance R6. And the other end of the resistance R6 is connected to the ground. The operation of the circuit in this embodiment can automatically detect whether the circuit is in the CCM or the DCM is the same as the embodiment in FIG. 3. It is not necessary to describe again. The purpose of this embodiment is to provide a structure in the synchronous step-up converter to have the automatically switching pulse skipping mode.

Figure 6:
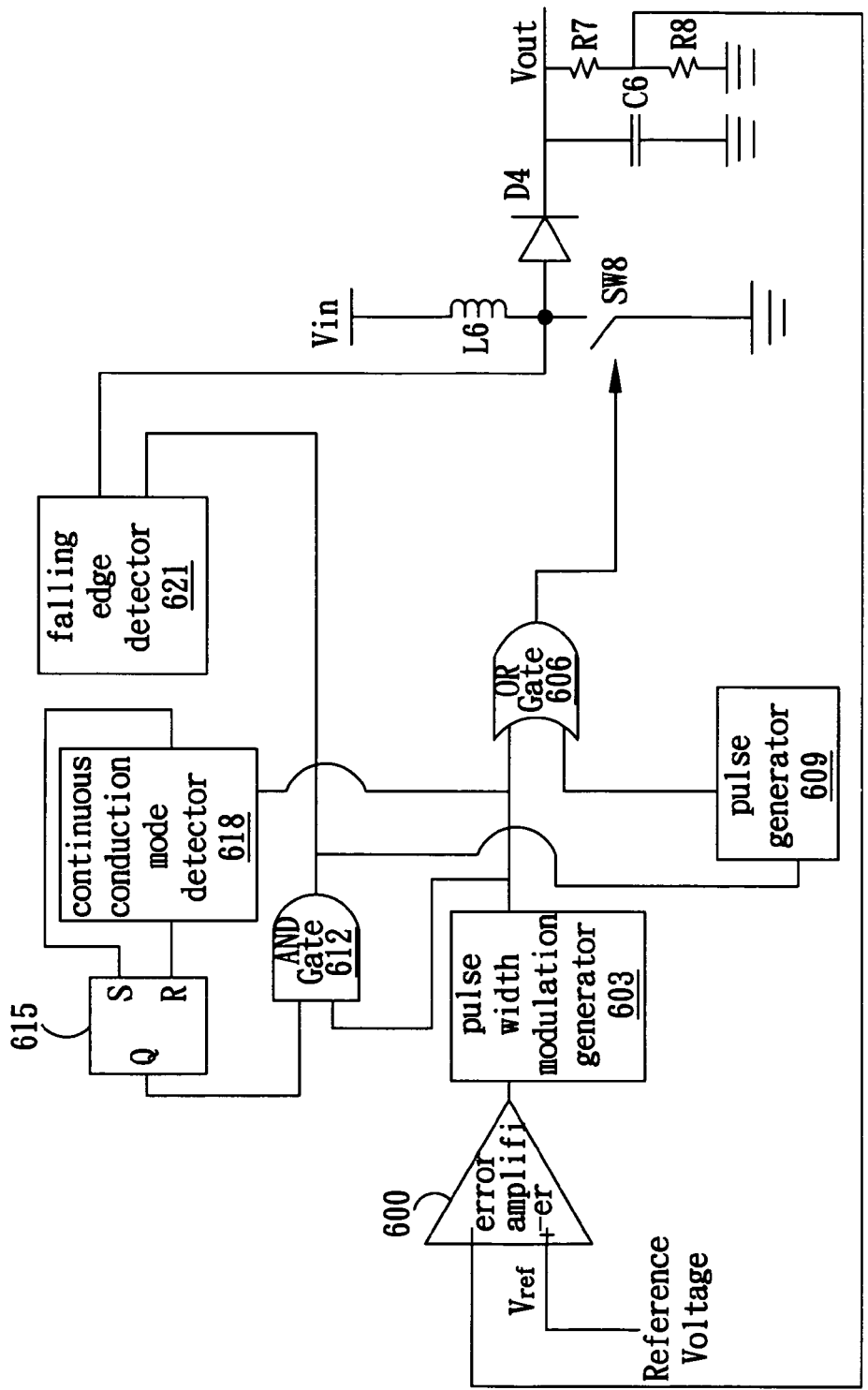
FIG. 6 is a pulse width modulation (PWM) asynchronous step-up converter with pulse skipping mode (PSM) in a preferred embodiment of the present invention.

The asynchronous step-up converter with automatically switching is shown in one embodiment of the present invention of FIG. 6. The converter comprises an error amplifier 600, a PWM generator 603, an OR gate 606, a pulse generator 609, an AND gate 612, a SR latch 615, a CCM detector 618, a falling edge detector 621, a switch SW8, a diode D4, an inductor L6, a capacitor C6, a resistance R7 and a resistance R8.

The negative input of the error amplifier 600 in FIG. 6 is received a feedback signal from the input divided voltage. The positive input of the error amplifier 600 is received a reference voltage Vref. After comparing the feedback signal and the reference voltage Vref, the error amplifier 600 outputs an error signal to the PWM generator 603. The output of the PWM generator 603 is connected to the input of the OR gate 606, the input of the AND gate 612, and the input of the CCM detector 618. The other input of the OR gate 606 is connected to the output of the pulse generator 609. The output of the OR gate 606 is connected to the switch SW8.

The one end of the inductor L6 is connected to the input voltage Vin, and the other end is connected to the diode D4 and the switch SW8. And the other end of the switch SW8 is connected to the ground. The diode D4 is connected between the switch SW8 and the inductor L6 and also connected to the other input of the falling edge detector 621. The other end of the diode D4 is connected to the capacitor C6 and the resistance R7. In addition, the voltage between the capacitor C6 and the resistance R7 is the output voltage Vout. The other end of the capacitor C6 is connected to the ground and the other end of the resistance R7 is also connected to the ground. The output of the falling edge detector 621 is connected to the S end of the SR latch 615 and the other input of the CCM detector 618. And the output of the PWM detector 618 is connected to the R end of the SR latch 615. The Q end of the SR latch 615 is connected to the other input of the AND gate 612. And the output of the AND gate 612 is connected to the input of the pulse generator 609 and the other input of the falling edge detector 621. The operation of the circuit in this embodiment can automatically detect whether the circuit is in the CCM or the DCM is the same as the embodiment in FIG. 4. It is not necessary to describe again. The purpose of this embodiment is to provide a structure in the asynchronous step-up converter to have the automatically switching pulse skipping mode.

Figure 7:
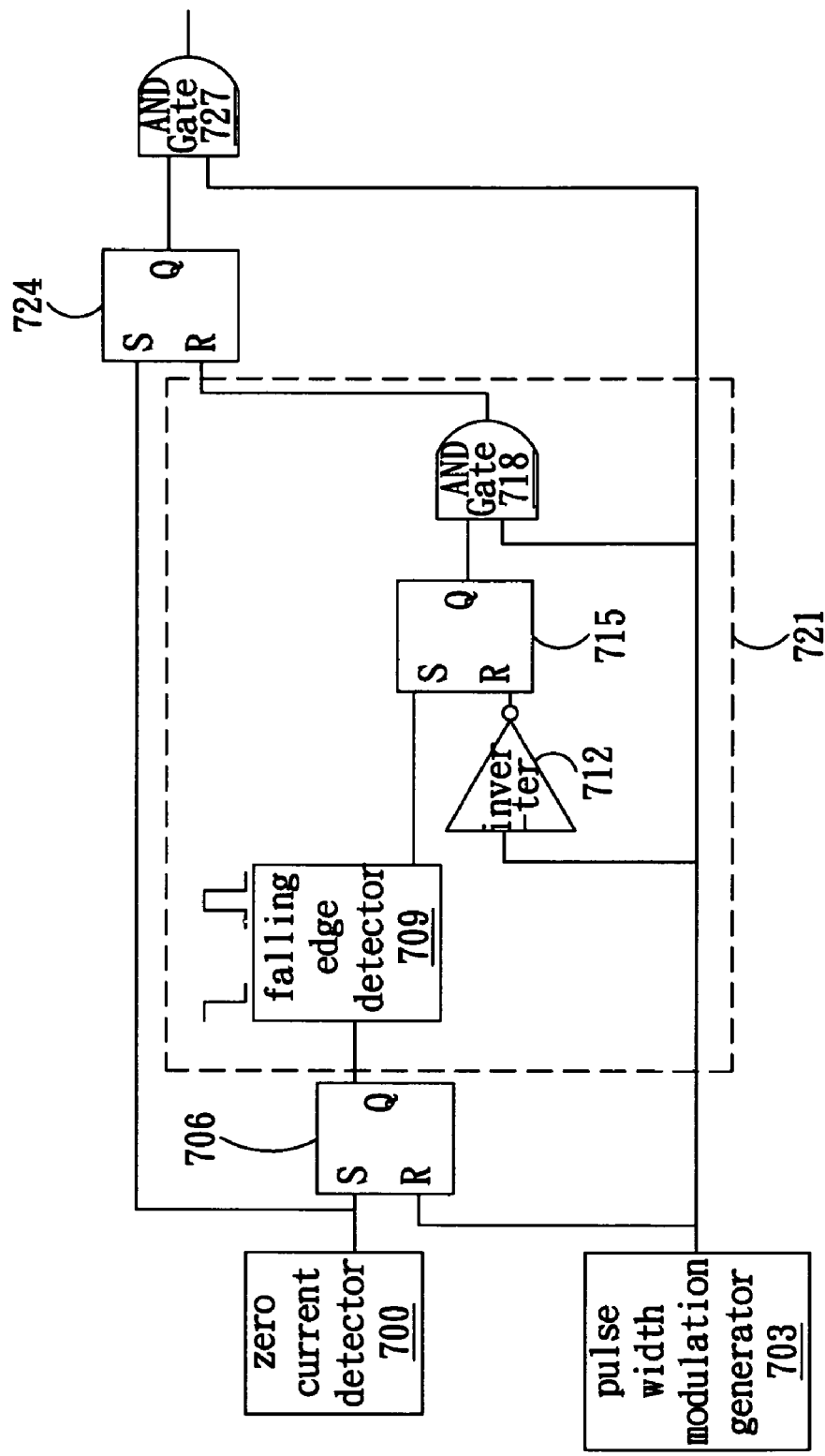
FIG. 7 is a pulse skipping mode (PSM) switch module in a preferred embodiment of the present invention.

The circuit of the pulse skipping mode switch module is disclosed in the embodiment of FIG. 7. The module is applied to adaptively enable or disable the pulse generator in the embodiments of FIG. 3 and FIG. 5 and achieve the goal of enabling or disabling the PSM in the circuit. In this circuit, the zero current detector 700 outputs a signal to the S end of the SR latch 706 to know if the current in the inductor current of the circuit is zero or not. The Q end of the SR latch 706 will convert the signal according to the signal of the S end and the R end of the SR latch 706, and then output it to the input of the CCM detector 721. The other input of the CCM detector 721 is received the signal from the PWM generator 703. After the CCM detector 703 comparing the signal from two inputs, the CCM detector 703 outputs a signal to know if the circuit is in the CCM and the signal is transferred to the R end of the SR latch 724. The Q end of the SR latch 724 outputs a signal to the input of the AND gate 727 according to the S end's signal, which is received from the zero current detector 700 and the signal of R end. The AND gate 727 outputs a control signal to enable or disable the pulse generator (not shown) according to the signal of the Q end of the SR latch 724 and the signal from the pulse width modulation generator 703.

The CCM detector 721 comprises a falling edge detector 709, an inverter 712, a SR latch 715, and a AND gate 718. The falling edge detector 709 detects if the signal, which is received from the Q end of the SR latch 706, has pulse falling edge and transfers the signal to the S end of the SR latch 715. The inverter 712 inverts the signal of the PWM generator 703 and transfers the signal to the R end of the SR latch 715. According to the signal of the S end and the R end of the SR latch 715, the Q end of the SR latch 715 outputs a signal to the input of the OR gate 718. The AND gate 718 outputs a control signal to the R end of the SR latch 724 according to the signal of the PWM generator 703 and the signal in the Q end of the latch 715 and knows if the circuit is operated in the CCM.

Figure 8:
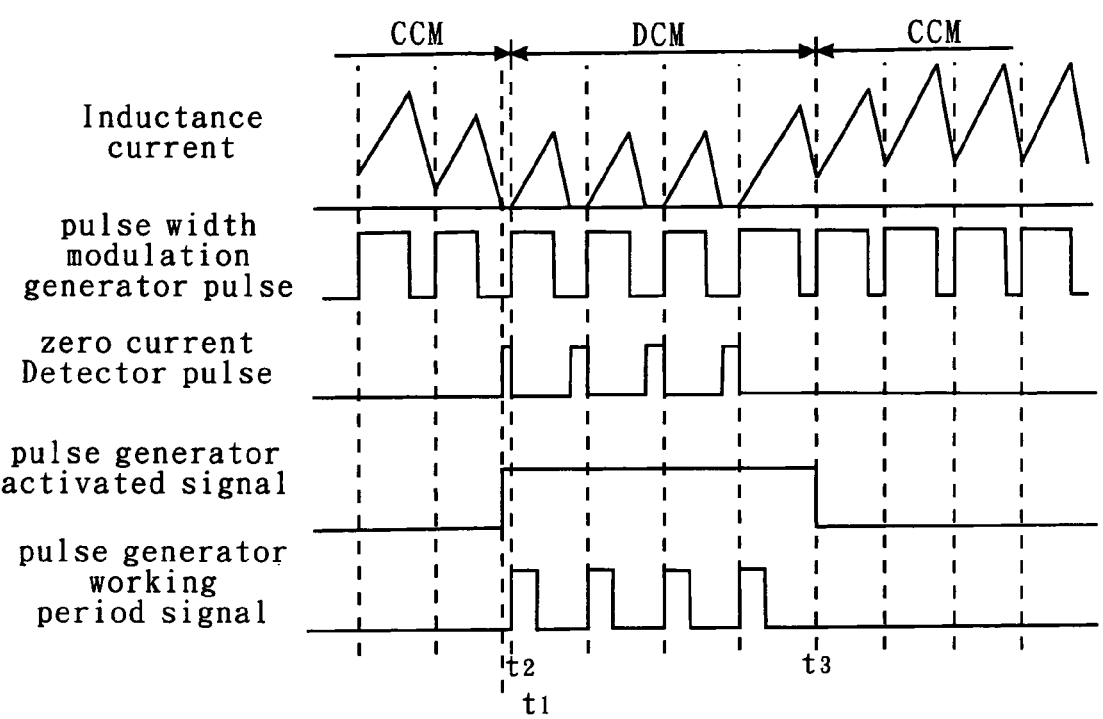
FIG. 8 is an oscillogram of the end point according to FIG. 3.

FIG. 8 is an oscillogragh illustrating how the signal in each end of the circuit to control the converter of FIG. 3 in the embodiment of the present invention. There are three steps, from left to right, showing in the inductor current of FIG. 8 according to the CCM or DCM. The circuit is in the CCM because the lowest value of the inductor current is not zero. Therefore, the output of the zero current detector 324 is the zero current detective pulse. Before the period of t1, there is no pulse generated. The second step is in the CCM because the inductor current is zero during the time between t1 and t2. The zero current detector 324 outputs a zero current detective pulse. At this time, there is a pulse signal generated and the front edge of the signal is in the AND gate 312. The pulse generator activates the signal from low logic voltage to high logic voltage. The time after t3 is the third step, the inductor current is not zero and the circuit is operated in the CCM. The zero current detector 324 outputs a zero current detective pulse. There is no pulse signal generated after t3, the pulse generator activates the signal from high logic voltage to low logic voltage.

During the time between t1 and t2, the pulse generator activates the signal in high logic voltage; the pulse front edge generated by the PWM generator 303 will activate the pulse generator 309 and output a working period signal of the pulse generator with a specific working period. The working period signal of the pulse generator let the circuit be in the pulse skipping mode. The period after the t3, the working period signal of the pulse generator is in the low logic voltage and the circuit will automatically disable the PSM.

Although specific embodiments have been illustrated and described, it will be appreciated by those skilled in the art that various modifications may be made without departing from the scope of the present invention, which is intended to be limited solely by the appended claims.

What is claimed is:

1. A pulse width modulation synchronous converter system with automatically switching pulse skipping mode, comprising:

a pulse width modulation synchronous converter, which is used to convert an input voltage to an output voltage by using pulse width modulation;

a pulse generator, which is used to generate a pulse signal with a specific working period when said pulse width modulation synchronous converter is in said pulse skipping mode;

an error amplifier, which is used to amplify an error signal, and said error signal is an error between a feedback signal and a reference signal;

a pulse width modulation generator, which is used to output a pulse width modulation signal according to said error signal; and a pulse skipping mode switch module, which is used to detect an inductor current and decide to enable or disable said pulse skipping mode, and comprising:

a zero current detector, which is used to detect said inductor current;

an edge detector, which is used to detect said edge of said signal pulse;

at least two latches, which are used to output a control signal;

a continuous conduction mode detect module, which is used to detect whether the circuit is working in said continuous conduction mode; and an AND gate, which is used to compare said control signal in one of said at least two latches and said pulse width modulation signal of said pulse width modulation generator.

2. A pulse width modulation synchronous converter system with automatically switching pulse skipping mode as set forth in claim 1, wherein said pulse width modulation synchronous converter comprises:

an error amplifier, which is used to amplify an error signal, and said error signal is an error between a feedback signal and a reference signal;

a pulse width modulation generator, which is used to output a pulse width modulation signal according to said error signal;

at least two switches, which is used to control said input voltage;

an inductor, which is used to save and release power; and a capacitor, which is used to save and release power.

3. A pulse width modulation synchronous converter system with automatically switching pulse skipping mode as set forth in claim 1, wherein said at least two latches comprise SR latches.

4. A pulse width modulation synchronous converter system with automatically switching pulse skipping mode as set forth in claim 3, said continuous conduction mode detect module comprising:

a falling edge detector, which is used to detect the falling edge of the signal;

a latch, which is used to output said control signal;

an inverter, which is used to be the signal buffer; and an AND gate, which is used to compare the signals.

* * * * *